July 17, 1923.
W. E. LAUSTER
1,462,115
VALVE TESTING DEVICE
Filed Aug. 19, 1921
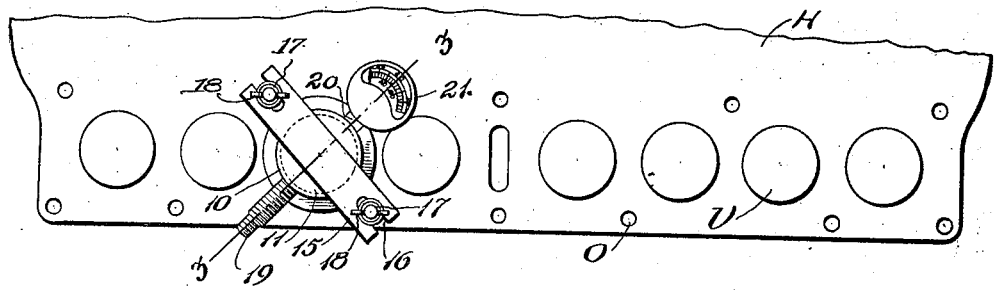
Fig.1.
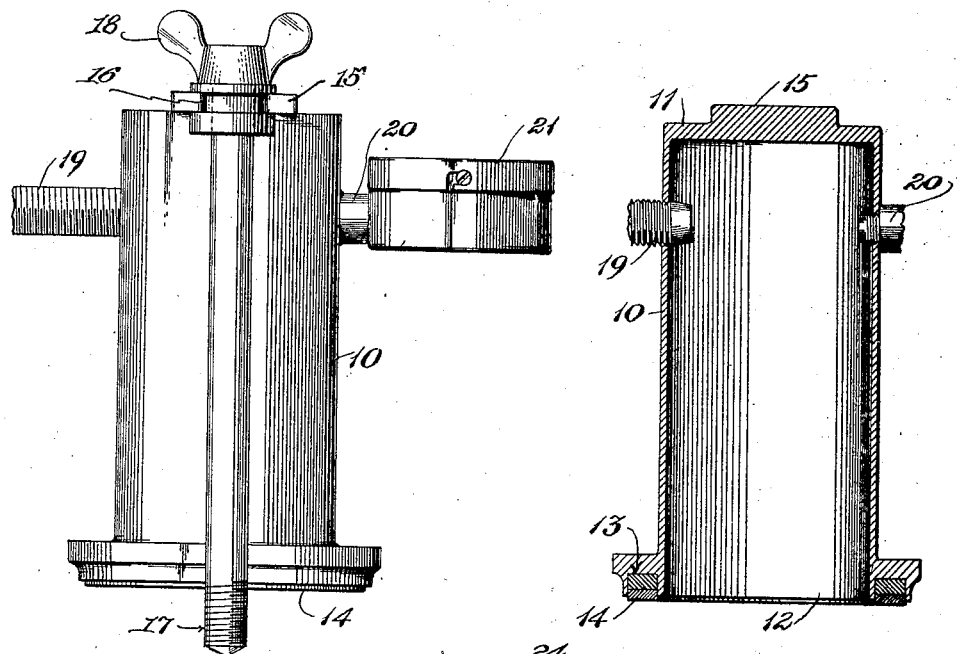
Fig.2.
Fig.3.
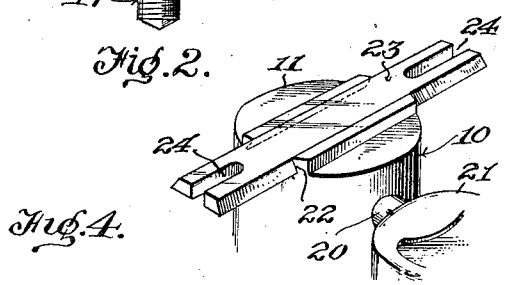
Fig.4.
Inventor
Wilbert E. Lauster,
Attorney Patented July 17, 1923.

1,462,115

UNITED STATES PATENT OFFICE.

WILBERT E. LAUSTER, OF YATESBORO, PENNSYLVANIA.

VALVE-TESTING DEVICE.

Application filed August 19, 1921. Serial No. 493,691.

*To all whom it may concern:*

Be it known that WILBERT E. LAUSTER, a citizen of the United States of America, residing at Yatesboro, in the county of Armstrong and State of Pennsylvania, has invented certain new and useful Improvements in Valve-Testing Devices, of which the following is a specification.

This invention relates to testing devices and has special reference to a device for testing the tightness of automobile valves, the device being preferably termed an automobile valve tester.

I am aware that devices have been provided for testing automobile valves but in the devices which have heretofore been used no method, other than hand pressure, has been provided for holding the device in position on the engine.

Such devices are naturally inefficient because it is impossible to properly maintain hand pressure for any required length of time.

One important object of the present invention is to provide an improved form of valve testing device which will be provided with suitable means whereby it may be pressed firmly on the head of the engine around the valve and held under the applied pressure as long as may be desired.

I am also aware that a hand pump has been used having an open end applied around the valve. Such devices are objectionable because of the necessary length of the pump and because due to such length, the device can not be used with all of the valves. In many automobile engines since certain kind of head valves as in the well known Ford automobile, are located underneath the dash of the automobile in a restricted space.

A second important object of the invention is to provide a short and compact construction of valve testing device which can be used in very restricted positions.

A third important object of the invention is to provide a valve testing device of novel construction which may be readily connected to the ordinary tire pump used in inflating the inner tube of the automobile tire.

With the above and other objects in view, the invention consists in general of certain novel details of construction and combinations of parts hereinafter fully described, illustrated in the accompanying drawings, and specifically claimed.

In the accompanying drawings, like characters of reference indicate ike parts in the several views, and:—

Figure 1 is a plan view of a portion of the top of an automobile engine showing the device applied thereto.

Figure 2 is a side elevation of the invention.

Figure 3 is a section on the line 3—3 of Figure 1.

Figure 4 is a perspective view of a modified form of the invention.

In the embodiment of the invention herein illustrated there is provided a hollow cylinder 10 closed at its upper end 11 and open at its lower end 12. The face of the end 12 is provided with an annular channel 13 and in this channel is seated a suitable elastic packing 14 which projects from the channel so that, when the device is applied to the head of an automobile engine the packing forms an air tight seal around the valve. Extending across the top of the cylinder is a bar 15 which is formed integral with the cylinder and has its ends projecting radially in opposite directions and provided with slots 16 for the reception of bolts 17 whereon are fitted butterfly nuts 18.

Securely fixed in the wall of the cylinder 10 is an ordinary inner tube valve 19 and, as is well known, such valves are in the form of inwardly opening check valves so that when pressure is produced within the cylinder the air under pressure will not escape through the valve. As is usual in such valves the end 19 is threaded for the reception of the end of a tire pump hose.

Extending from the cylinder 10 is a nipple 20 carrying a pressure gage 21 suitably indexed to show the number of pounds pressure in the cylinder 10.

In the modification shown in Figure 4 it will be seen that the closed end 11 is provided with a dove-tailed slot 22 and that, in place of the integral bar 15 a dove-tailed bar 23 fits in this slot and is provided at its ends with slots 24 for the holding down bolts.

In order to understand the use of the device we will assume that the valves in a Ford automobile are to be tested. To do this the bolts which hold the valve casing are removed and the case itself is lifted off the head of the engine. This will leave the head H exposed with the bolt openings O empty and the valves B showing. As will be seen from Figure 1 the bolt openings in a machine of this class are staggered back and forth across the row of valves. One of the bolts 17 is then screwed into an opening O. The device is placed over the valve and the other bolt 17 is screwed into position. The wing nuts are then used to compress the cylinder firmly down on the head H. The valve is then connected to a tire pump or other source of air pressure and the desired pressure is produced in the cylinder 10. The pump may then be disconnected and the device left in position a sufficient time to determine whether there is any leak around the valve being tested. After testing one valve the air pressure can be released, one bolt 17 removed, and the device swung on the other bolt to test the next valve. Thus by starting at one end all of the valves may be tested by simply shifting one bolt at a time.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. A valve testing device for automobile engines comprising a cylinder having one end closed and the other end opened, said open end being provided with packing on its face, an automobile tire valve connected under and opening into said cylinder, an air gauge carried by the cylinder, and a bar extending diametrically through the axis of the cylinder and slidable in the direction of its length, said bar being provided with openings at its end for the reception of holding down bolts.

2. A valve testing device for automobile engines comprising a cylinder having one end closed and the other end open, said open end being provided on its face with an annular channel, packing held in said channel and projecting therefrom, projections at the top of said cylinder extending outward from the cylinder in opposite radial directions and overhanging the base, said projections being slotted to receive the upper ends of holding down bolts, an automobile tire valve connected to and opening into said cylinder, and an air gauge carried by the cylinder.

3. A valve testing device for automobile engines comprising a cylinder having one end closed and other end open, said open end being provided on its face with an annular channel, packing held in said channel and projecting therefrom, said cylinder having its closed end provided with a dove-tailed slot extending across the end, a bolt receiving strip fitting in said slot and provided with ends projecting from the cylinder and slotted to receive the upper ends of holding down bolts, an automobile tire valve connected to an opening into said cylinder, and an air gauge carried by the cylinder.

In testimony whereof I affix my signature.

WILBERT E. LAUSTER.